United States Patent [19]

Nolte

[11] Patent Number: 4,796,481
[45] Date of Patent: Jan. 10, 1989

[54] HEIGHT-ADJUSTABLE STEERING COLUMN FOR MOTOR VEHICLES

[75] Inventor: Frank Nolte, Osnabruck, Fed. Rep. of Germany

[73] Assignee: Lemforder Metallwaren AG, Fed. Rep. of Germany

[21] Appl. No.: 118,420

[22] Filed: Nov. 9, 1987

[30] Foreign Application Priority Data

Nov. 8, 1986 [DE] Fed. Rep. of Germany ....... 3638163

[51] Int. Cl.⁴ .............................................. B62D 1/18
[52] U.S. Cl. ..................................... 74/493; 280/775; 384/517; 411/291
[58] Field of Search .......................... 74/493; 280/775; 384/517; 411/291

[56] References Cited

U.S. PATENT DOCUMENTS

| | | | |
|---|---|---|---|
| 171,898 | 1/1876 | Wiles | 411/291 |
| 3,216,521 | 11/1965 | Ulrich | 280/775 X |
| 4,602,520 | 7/1986 | Nishikawa et al. | 280/775 X |
| 4,716,780 | 1/1988 | Nishikawa et al. | 280/775 X |

Primary Examiner—Allan D. Herrmann
Attorney, Agent, or Firm—McGlew and Tuttle

[57] ABSTRACT

A height-adjustable steering column for motor vehicles which is retractable and extendible by means of a drive motor, comprises an inner steering spindle assembly of axially telescoping parts, of which an upper one is connected with the steering wheel, as well as a jacket tube in which an axially displaceable part of the steering spindle assembly is rotatable and is arranged axially displaceable in a housing inside the jacket tube. A coupling member drivable by the drive motor is axially non-displaceable relative to the housing and has a drive pinion which engages in a serration on the circumference of the jacket tube.

9 Claims, 3 Drawing Sheets

HEIGHT-ADJUSTABLE STEERING COLUMN FOR MOTOR VEHICLES

BACKGROUND OF THE INVENTION

Field of the Invention

This invention relates in general to vehicle steering devices and in particular to a new and useful height-adjustable steering column for motor vehicles.

A similar steering column is known from DE-PS No. 33 18 935. The coupling member for transmission of the motor drive forces to the jacket tube consists, according to this, of a rackrail disposed on the circumference of the jacket tube which is movable in the housing and in which there engages a worm gear disposed axis-parallel thereto, for the penetration of which a cutout is provided in the housing. The worm gear as well as the drive motor are mounted or secured on the outside of the housing. Depending on the set direction of rotation of the drive motor, therefore, the steering column is retractable or extendible in a telescope fashion. The internally mounted steering spindle follows these movements because it, too, has telescoping parts, of which one is mounted non-displaceable in axial directions in the jacket tube and one is rotatable but axially non-displaceable on the body side.

SUMMARY OF THE INVENTION

The invention provides a drive motor for the height-adjustment of a steering column having a minimum cost of manufacture, with as small as possible a mass of the adjustable parts, and above all adjusting forces of the drive motor acting substantially symmetrically to the mediam longitudinal axis of the steering column.

The invention may be effected using rotation-symmetrical rotating parts, and therefore it can be manufactured at low cost and also is easy to install. All parts with appreciable mass are fastened on the body side, it being possible to make the adjustable parts with a small mass, as desirable for the protection of the passengers in collisions. Above all, the adjusting forces of the drive motor act substantially symmetrical to the median longitudinal axis of the steering column on the parts thereof, whereby a very low-friction adjustment movement is achieved. This is not only comfortably effective, but also permits a further reduction of the mass of the structural parts used. In a preferred application of the invention features for high demands, the threaded nut and the parts connected with it can be made of a lightweight but high-strength plastic. Special advantages of the invention features result also in conjunction with an arrangement for the adjustment of the angle of inclination of the steering wheel secured on the upper end of the steering spindle, as will be explained later on in connection with an embodiment example.

In conjunction with the partial objective relating to the low cost of construction, a design is provided whose features permit the arrangement of the structural parts needed for the adjustment drive outside the housing, so that there is no need to have machining operations that would increase the cost.

In order that a minimum of mass of the parts intended for the adjusting will move when the jacket tube is being adjusted in axial direction, a thread of high pitch is provided between the threaded nut and the jacket tube, so that little rotation of the nut will lead to the desired axial displacement of the jacket tube. The high pitch of the threaded between the nut and the tube is to be seen in conjunction with the gear transmission ratio between the drive motor and the nut, which reduces the motor speed to a slow movement of the nut. The high pitch and the use of a rectangular thread result, above all, in small friction losses between the nut and the thread on the jacket tube.

Accordingly, it is an object of the invention to provide a height-adjustable steering column for a vehicle which comprises an inner steering spindle assembly which includes a plurality telescopic parts including an upper part having a steering wheel connecting end and an inner rotatable steering spindle part which is adapted to be connected to the steering mechanism and wherein a jacket telescopic over the spindle assembly and a drive motor which is carried on the spindle assembly for the jacket as a drive pin which drive a rotatable gear carried by one of the telescopic parts and a coupling arrangement which provide for the actual displacement of the steering spindle assembly relative to the jacket tube for extending or retracting the height of the steering column.

A further object of the invention is to provide a height-adjustable steering column which includes means for rotating one of a plurality of telescopic parts of the steering column relative to the other so as to cause its axial movement relative to the other and either the extension or retraction of the column and which also includes an upper part of the column which is hinged to a lower part and with a drive connection between the parts which causes a tilting movement of the upper part relative to the lower part.

A further object of the invention is to provide a height-adjustable steering column which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawing and descriptive matter in which preferred embodiments of the invention is illustrated.

GENERAL DESCRIPTION OF THE PREFERRED EMBODIMENT

Figure 1:
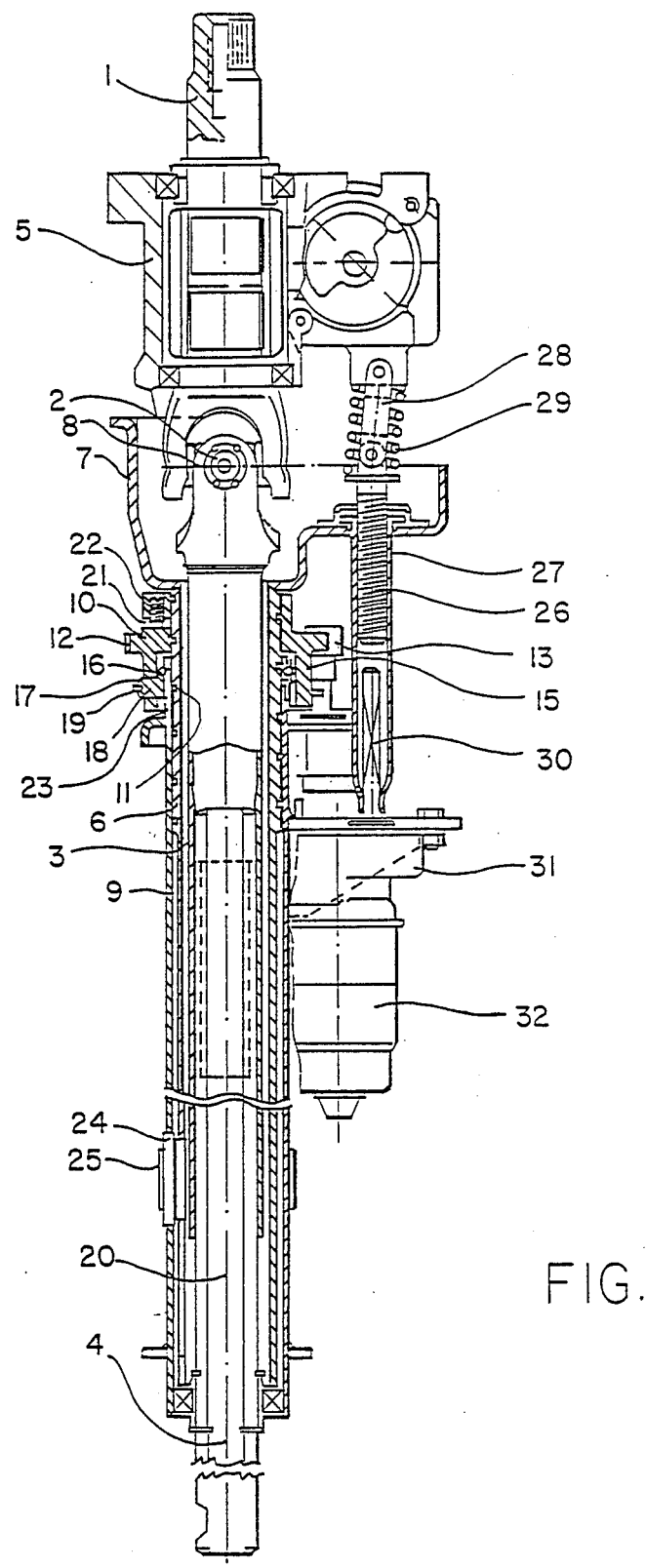
FIG. 1 is an axial sectional view through a steering column constructed in accordance with the invention.

Referring to the drawings in particular, the invention embodied therein comprises a height-adjustable steering column for a vehicle which comprises an inner steering spindle assembly including a steering spindle part 4 having a lower drive connection to the steering mechanism as well as a tubular housing 9 which is telescopic in respect to the part 4 and a jacket tube 6 containing the part 4 and having exterior threads 11 which are engaged by a threaded part 10 to effect relative telescopic movement in axial directions between jacket tube 6 and an outer tubular housing 9.

The embodiment shows a height-adjustable steering column having a head portion of which is adjustable in inclination simultaneously with the steering wheel not shown in the drawing.

Figure 2:
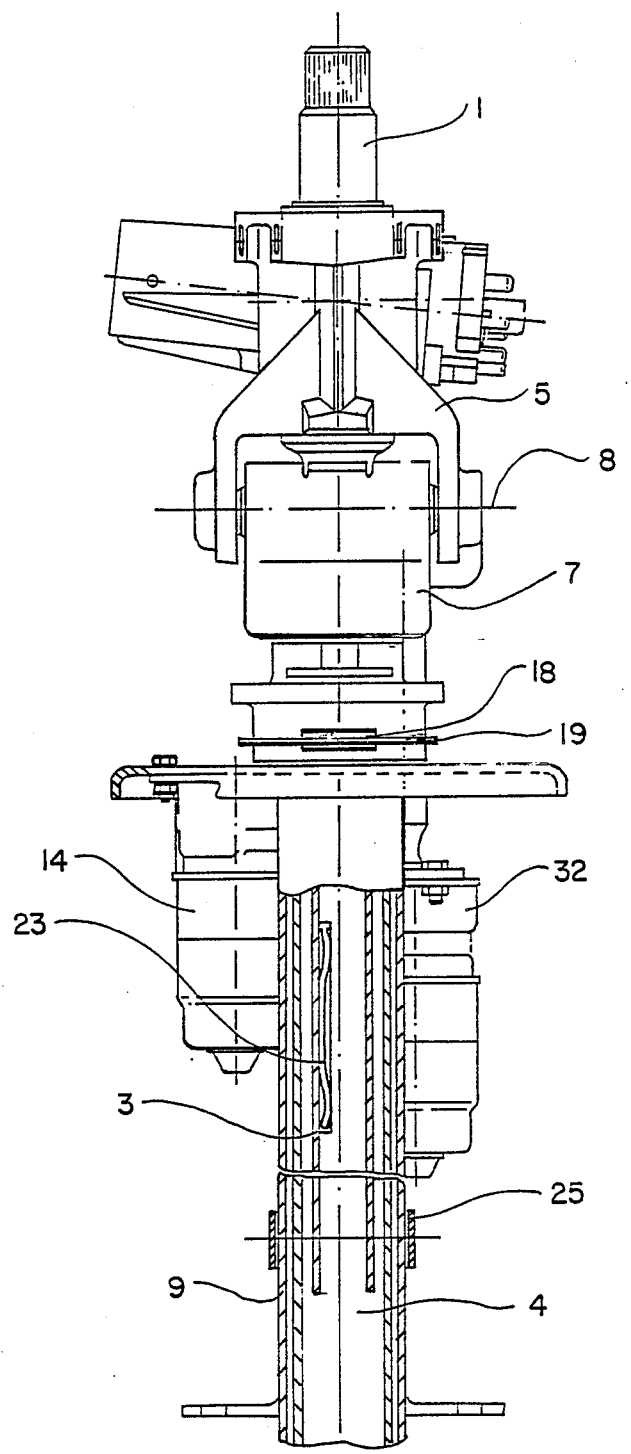
FIG. 2 is a view offset by 90 degrees from that of FIG. 1 in partial section.
Figure 3:
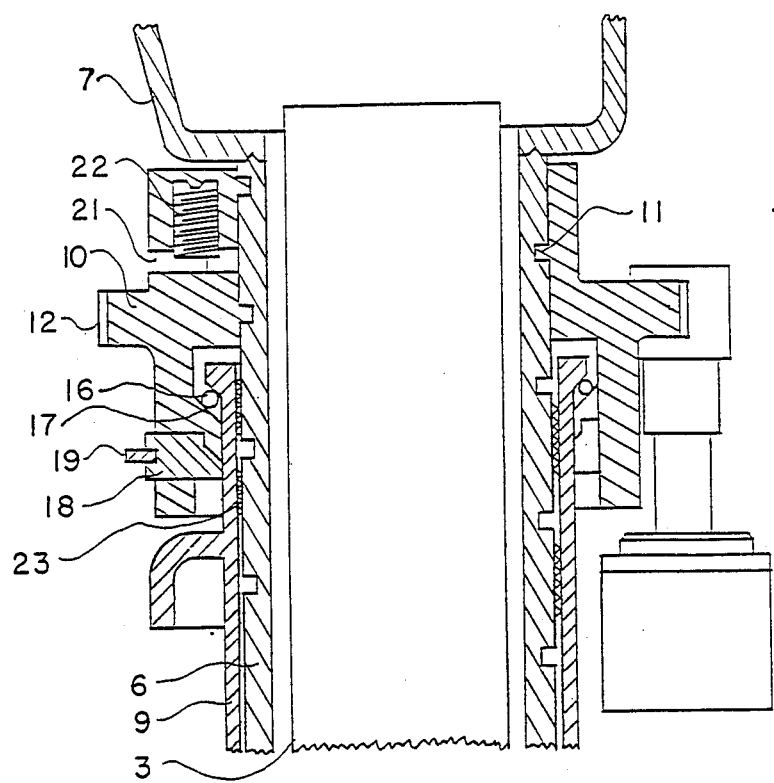
FIG. 3 is an enlarged view of a portion of FIG. 1.

The multi-part steering spindle of the steering column comprises an upper part 1, connectable with the steering wheel at the free upper end, and of the lower part 3 which is connected with the upper part by a universal joint 2 and which in turn is arranged axially displaceable in telescope fashion on a further part 4. The part 4 is mounted axially non-displaceable but rotatable relative to the tubular housing 9. The upper part of the steering spindle 1 is mounted rotatable in an upper housing part 5, while the axially adjustable part 3 of the steering spindle is mounted rotatable in an axially displaceable jacket tube 6 but not axially moveable therein but together with this jacket tube 6 can be adjusted axially. A bell-shaped widening 7 at the upper end of the jacket tube 6 and the housing 5 are joined together by a pivot joint, the tilting axis 8 of which coincides with the center of the universal joint 2 (FIG. 2).

The jacket tube 6 is arranged not rotatable but axially adjustable inside a tubular housing 9 so that, together with the lower part 3 of the steering spindle, the upper part 1 of the steering spindle, and the housing part 5, it is retractable and extendible relative to the housing 9 fixed on the body side. For this height adjustment of the steering column there is arranged on the upper end—brought out of housing 9—of the jacket tube 6 a threaded nut 10 which is axially non-displaceable relative to the housing 9, and the female thread of which engages in a thread on the outer wall of the jacket tube 6, a thread of relatively high pitch being preferred. This high-pitch thread is illustrated in FIG. 1 with turns 11 on the periphery of the jacket tube 6. Engaging in an outer toothed rim 12 of this nut 10 is the pinion 13 of a drive motor 14 of reversible direction of rotation. The threaded nut 10 has a lateral cylindrical projection 15 which is provided for a ballbearing and assumes the suspension on the upper end of housing 9. The inner race of the balls 16 of a ball bearing serving for the suspension is machined into the generated surface of housing 9, while the outer race 17 of the ball bearing is pretensioned from the outside inwardly, to achieve a slackfree suspension. This pre-tension originates from segments 18 with a slanting surface opposite a radial plane, this slanting surface cooperating with a countersurface on the bearing ring formed of outer race 17. Several segments 18 are arranged distributed in the cylindrical projection 15 on the circumference and braced by a spring ring 19 in the direction of the median longitudinal axis 20 of the steering column, so that the segments 18 exert tensioning forces in radial directions and also in axial directions, and bring about a slackfree suspension of the threaded nut 10 on the housing 9. To achieve a slackfree thread engagement, a radial notch 21 with an axis-parallel set screw 22 is provided at a circumferential point of the nut, so that the turns of the female thread of nut 10 can be pushed apart in an axial direction, to be able to adjust an absolutely slackfree thread engagement. For slack compensation between the jacket tube 6 and the housing 9, a corrugated spring 23 is inserted between the two. In addition, at the lower end of the housing several sliding blocks 24 are distributed over the circumference and engage in slots in the jacket tube 6 and are held therein chatterfree by slack-compensating springs, so that they connect the jacket tube 6 and the housing 9 with one another non-rotationally. A spring ring 25 embraces the sliding blocks 24 and secures them against falling out.

For adjusting the inclination of the steering wheel secured on the upper part 1 of the steering spindle, the upper housing part 5 is connected with the bell-shaped enlargement 7 of the jacket tube 6 by an arrangement also adjustable by motor. According to a preferred solution, this arrangement includes a threaded screw 26 screwable in a nut 27 which is mounted rotatable in the bell-shaped enlargement 7 but axially non-displaceable. One end of the threaded screw 26 is articulated to the upper housing part 5 by hinge plates 28, at least two joint bearing points being provided. The hinge plates 28 are disposed within a helical spring 29, which braces itself on one side against a collar at the threaded screw 26 and on the other side against a projection of the upper housing part 5 and therefore places the joint connections of the hinge plate 28 under pretension in stretching direction. The lower end of the threaded nut 27 is in the form of a sleeve and is arranged axially displaceable on a driver pin 30 connected via a countershaft gearing 31 with a second drive motor 32. The latter design enables the threaded nut 27 to follow the axial adjustment movement of the jacket tube 6 with its bell-shaped enlargement 7 and with the head portion of the steering column seated thereon, although the drive motor 32 with the gearing 31 is arranged fixed on the body side, e.g., on the housing 9. Depending on the direction of rotation of the drive motor 32, screw 26 is screwed out of or into nut 27, so that thereby an adjustment of the upper housing part 5 about the tilting axis 8 and hence a setting of the inclination of the steering wheel secured on the upper part 1 of the steering spindle takes place.

What is claimed is:

1. A height-adjustable steering column for a vehicle, comprising an inner steering spindle assembly of telescopic parts including an upper part having a steering wheel connecting end, an inner rotatable steering spindle part having a drive connection end and a jacket tube telescopic over said steering spindle part, a tubular housing overlying said steering spindle assembly and a drive motor coupling means carried by one of said tubular housing in said jacket tube and driveably connected to the other of said housing and jacket tube for displacing said jacket tube relative to said housing for extending and retracting said jacket tube with said steering spindle part relative to said tubular housing.

2. A height-adjustable steering column according to claim 1 wherein said drive motor coupling means comprises a threaded nut arranged coaxially to the longitudinal axis of said jacket tube and of said housing, said jacket having an outer thread threadably engaged with said nut.

3. A height-adjustable steering column according to claim 2 wherein said threaded nut has an axially extending threaded portion and is mounted on said housing has a cylindrical projective part and is provided for a ball bearing for said threaded nut.

4. A height-adjustable steering column according to claim 2 wherein said threaded nut has a mounted tooth rim, said drive motor coupling means including a electric drive motor carried on said housing having a driving pinion engaged with said tooth rim.

5. A height-adjustable steering column according to claim 1 wherein said jacket tube has an exterior thread said drive coupling means includes a member having a thread engageable with the exterior thread of said jacket tube, both said thread having very large pitch.

6. A height-adjustable steering column according to claim 1 wherein said jacket tube includes an upper portion containing a nut which is secured thereto and which has a cylindrical projection with axially extending slots therein extending around the circumference thereof and defining segments, spring means to radially load said segments, said segments having wedged faces directed obliquely relative to a radial plane which cooperate with counter-faces on a ball bearing outer race of a ball bearing rotatably carried by said cylindrical projection so that said wedge faces bear against said race radially and axially.

7. A height-adjustable steering column according to claim 1 wherein said drive motor coupling means includes a ring member secured to the exterior of said jacket tube has a threaded nut having threaded engagement elements, said threaded engagement elements having a, threadable element to bind on said jacket tube and including a radial notch defined in said threaded nut and a transverse plane relative to its axis having limiting faces which are braceable against each other by means of a set screw.

8. A steering column comprising: a tubular non-rotatable steering column housing; a steering spindle rotatively mounted with respect to said steering column housing, said steering spindle having an end extending into said housing; a lower steering column part with a lower end, said lower end extending into said housing, said lower steering column part lower end being axially displaceably connected to said steering spindle for rotation therewith, said lower steering column part having an upper part; a universal joint connected to said lower steering column part upper end; an upper steering column part having a lower end connected to said universal joint for rotation with said steering column lower part; axial displacement means connected to said steering column lower part and connected to said steering column housing, for axially displacing said steering column lower part with respect to said steering column housing; and, inclination adjustment means connected to said upper part, said inclination adjustment means for altering the inclination of said steering column upper part with respect to said steering column lower part about said universal joint.

9. A steering column according to claim 8, wherein said axial displacement means includes: a drive motor with a pinion; a threaded nut with an outer toothed rim engageable with said pinion; a jacket tube having an outer threaded portion for engagement with said threaded nut, said jacket tube being axially displaceable relative to said tubular housing upon rotation of said threaded nut and being non-rotatable with respect to said tubular housing, said lower part being rotatable with respect to said jacket tube and being fixed axially with said tube jacket for axial movement therewith.

* * * * *